(12) United States Patent
Tajima et al.

(10) Patent No.: US 9,180,781 B2
(45) Date of Patent: Nov. 10, 2015

(54) ELECTRIC AUTOMOBILE

(71) Applicant: HONDA MOTOR CO., LTD., Tokyo (JP)

(72) Inventors: Takamitsu Tajima, Utsunomiya (JP); Kotaro Shigeno, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 14/079,329

(22) Filed: Nov. 13, 2013

(65) Prior Publication Data

US 2015/0130423 A1 May 14, 2015

(51) Int. Cl.
*H02J 7/00* (2006.01)
*B60L 11/18* (2006.01)

(52) U.S. Cl.
CPC ......... *B60L 11/1801* (2013.01); *B60L 11/1811* (2013.01)

(58) Field of Classification Search
CPC .................. B60L 11/1801; B60L 11/1811
USPC ........................................................ 320/137
See application file for complete search history.

(56) References Cited

U.S. PATENT DOCUMENTS

| | | | |
|---|---|---|---|
| 2008/0234897 A1* | 9/2008 | Tsuchida | 701/42 |
| 2009/0322148 A1 | 12/2009 | Kitanaka | |
| 2010/0121509 A1 | 5/2010 | Takeshima et al. | |
| 2011/0039173 A1* | 2/2011 | Kanazu | 429/423 |
| 2014/0009855 A1* | 1/2014 | Yamamoto | 361/42 |

FOREIGN PATENT DOCUMENTS

| | | |
|---|---|---|
| WO | 2008/018131 A1 | 2/2008 |
| WO | 2009/001788 A1 | 12/2008 |

* cited by examiner

*Primary Examiner* — Vuthe Siek
(74) *Attorney, Agent, or Firm* — Westerman, Hattori, Daniels & Adrian, LLP

(57) ABSTRACT

Even when a high voltage in electric railways is applied from power lines, an electric automobile makes it possible to apply an appropriate voltage lower than the high voltage to a motor and an inverter that supplies the motor with electric power. The electric automobile includes, a first DC/DC converter that steps up the battery voltage of a high-voltage battery to a level corresponding to an power line feeding voltage, a second converter connected between power line contact terminals, which are brought into contact with power lines to receive electric power from the power lines under the high power line feeding voltage, and the DC terminals of the inverter for energizing the motor. Therefore, even if the high power line feeding voltage is applied from the power lines, the second DC/DC converter functions as an electric damping device to prevent the high voltage from being applied to the inverter.

4 Claims, 6 Drawing Sheets

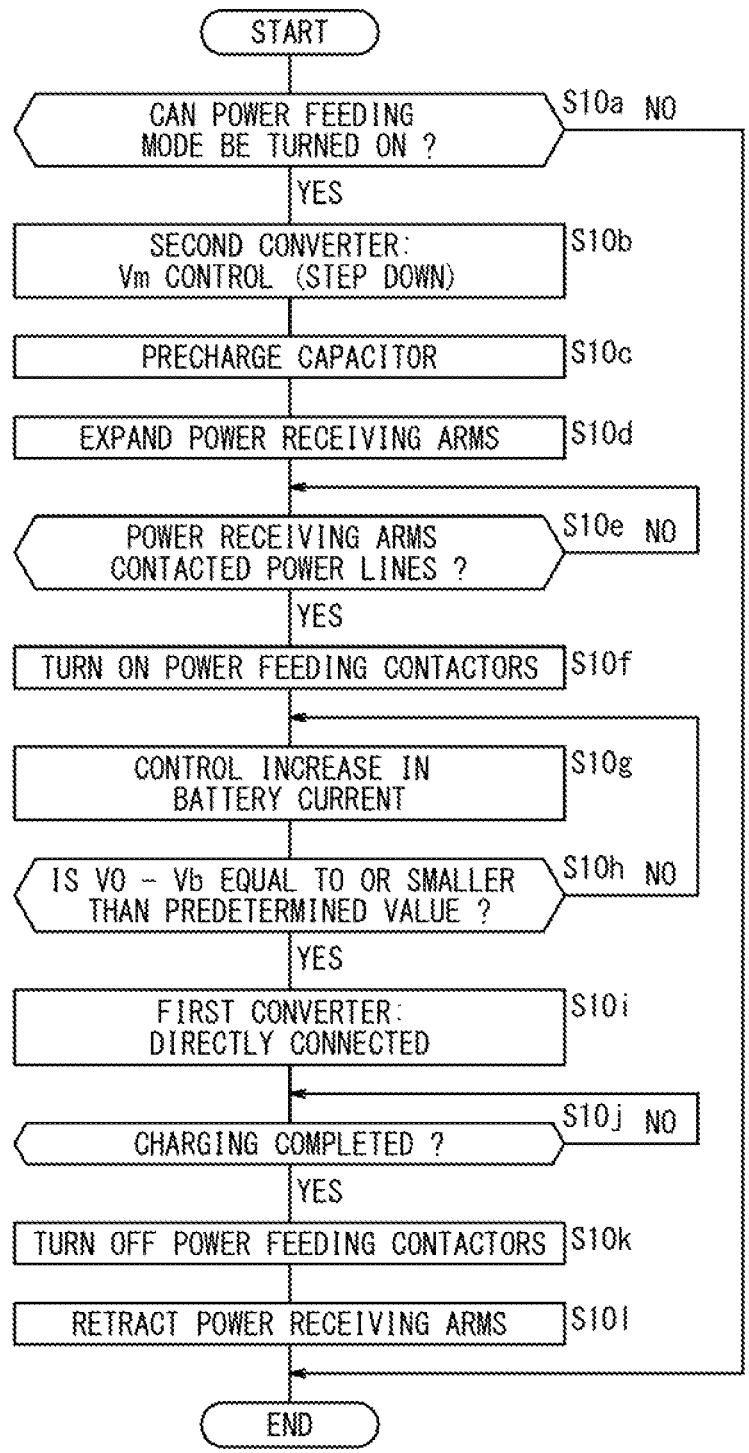

FIG. 5

| TRAVELING MODE | | FIRST CONVERTER | SECOND CONVERTER |
|---|---|---|---|
| I: POWER MODE CONTROL PROCESS | VOLTAGE FROM HIGH-VOLTAGE BATTERY TO INVERTER IS STEPPED DOWN | DIRECTLY CONNECTED (P1 = P2 = 0 [%]) | Vm CONTROL |
| II: PRE-FEEDING CONTROL PROCESS | Vo IS STEPPED UP UNTIL POTENTIAL DIFFERENCE BETWEEN Vh AND Vo BECOMES EQUAL TO OR SMALLER THAN PREDETERMINED VOLTAGE | Vo CONTROL (PRECHARGE) | Vm CONTROL |
| III: INITIAL FEEDING CONTROL PROCESS | Ib IS CONTROLLED TO GRADUALLY INCREASE | Ib CONTROL (CURRENT INCREASE CONTROLLED) | Vm CONTROL |
| IV: FEEDING CONTROL PROCESS | EXTERNAL POWER SUPPLY DEVICE AND HIGH-VOLTAGE BATTERY ARE DIRECTLY CONNECTED | DIRECTLY CONNECTED (P1 = 100 [%], P2 = 0 [%]) | Vm CONTROL |
| V: REDUCED-SOC CONTROL PROCESS | VOLTAGE DROP IS COMPENSATED FOR BY FIRST CONVERTER | Vm CONTROL | DIRECTLY CONNECTED (P3 = 100 [%], P4 = 0 [%]) |
| VI: REGENERATIVE CONTROL PROCESS | DUTY RATIO OF PWM SIGNAL P1 IS SET TO 100 [%] AND CHARGE REGENERATED ELECTRIC POWER INTO HIGH-VOLTAGE BATTERY | DIRECTLY CONNECTED (P1 = 100 [%], P2 = 0 [%]) | DIRECTLY CONNECTED (P3 = P4 = 0 [%]) |

ELECTRIC AUTOMOBILE

BACKGROUND OF THE INVENTION

1. Field of the Invention

The present invention relates to an electric automobile for converting electric power supplied from an electric energy storage device mounted on the electric automobile and/or power lines through power line contact terminals on the electric automobile, by an inverter mounted on the electric automobile, and supplying the converted electric power to a motor for propelling the electric automobile.

2. Description of the Related Art

Heretofore, there has been proposed an electric automobile that is propelled by a motor which is energized by electric power supplied from power lines or electric power stored in a battery counted on the electric automobile (see WO2009/001788).

The battery on the electric automobile is charged with the electric power that is supplied from the power lines through a power collector on the electric automobile which is held in contact with the power lines. At the same time, the electric power is converted by an inverter mounted on the electric automobile and supplied to the motor to propel the electric automobile. When the electric motor travels on a road which is free of power lines, the electric power stored in the battery is supplied from the battery through the inverter to the motor (see Abstract of WO2009/001788).

WO2006/018131 discloses an apparatus for controlling electric care in the field of electric railways.

SUMMARY OF THE INVENTION

An electric car disclosed in WO2000/018131 has an inverter for supplying electric power to a propulsive motor and a DC/DC converter connected parallel to the inverter, wherein, the DC/DC converter is supplied with electric power from an input electric power source in the form of an electric energy storage device. The DC/DC converter steps up the voltage of the electric energy storage device up to an input voltage of the inverter by a reactor and upper and lower arm switching elements.

The power collector is connected between the input terminals of the inverter through a switch. The power collector is held in sliding contact with the power lines when it receives electric power from the power lines.

The electric car thus constructed basically operates by energizing the motor through the inverter with either the electric power which has its voltage stepped up from the voltage of the electric energy storage device by the DC/DC converter or the electric power supplied from the power lines.

The electric car disclosed in WO2000/018131 travels selectively in two different travel modes. In the first travel mode, the electric car runs with only the electric power from the electric energy storage device while the power collector is being spaced from the power line in order to prevent a inrush current from flowing from the power line at the time the power lines and the power collector are held in contact with each other. In the second travel mode, the electric car runs with the electric power supplied from the power lines when the power collector is held in contact with the power lines. For changing from the first travel mode to the second travel mode, the switch is opened and the power lines and the power collector are brought into contact with each other. While the power lines and the power collector are being held in contact with each other, the input voltage of the inverter is gradually stepped up to the voltage of the power lines by the DC/DC converter, based on the electric power from the electric energy storage device. When the difference between the input voltage of the inverter and the voltage of the power lines becomes small enough, the open switch is closed to prevent an inrush current from flowing and also to prevent the switch contacts from being disrupted due to the voltage difference (see paragraphs [0025], [0026] of WO2008/018131).

The apparatus for controlling electric cars on electric railways according to the above related art is of a high-voltage design applicable to an infrastructure whose power line voltage la in the range from 600 [V] to 1500 [V] (see paragraph [0022] of WO2008/018131). Cost and dimensional limitations make it extremely difficult to apply this controlling apparatus to electric automobiles that are operable with a general power supply whose voltage is in the range from 100 [V] to 200 [V].

If the controlling apparatus is applied to an electric automobile, then the high voltage of the power lines is directly applied to the inverter and also through the inverter to the motor. The electric power consumed by the inverter increases, and the cost required to take countermeasures for preventing the inverter from being unduly heated also increases. The motor needs to be a high-voltage motor that is costly and large in size.

The present invention is made in view of such problems. It is an object of the present invention to provide an electric automobile which, even when a high voltage used in the field of electric railways is applied from power lines, mates it possible to apply an appropriate voltage lower than such a high voltage to a motor and an inverter that supplies the motor with electric power, so that the inverter is prevented from being unduly heated and the inverter and the motor are relatively small in size.

According to the present invention, there is provided an electric automobile for converting electric power supplied from an electric energy storage device mounted on the electric automobile and/or power lines through power line contact terminals on one electric automobile, by an inverter mounted on the electric automobile, and supplying the converted electric power to a motor for propelling the electric automobile, comprising a first DC/DC converter connected between terminals of the electric energy storage device and the power line contact terminals, a second DC/DC converter connected between the power line contact terminals and terminals of the inverter, and a control device for controlling the first DC/DC converter and the second DC/DC converter, wherein when the electric power is supplied from the power lines through the power line contact terminals, the control device controls the second DC/DC converter to make a voltage applied to the inverter able to deal with electric power required by the motor, and when no electric power is supplied from the power lines with the power line contact terminals being spaced from the power lines, the control device controls the first DC/DC converter to be in a directly connected state and controls the second DC/DC converter to make the voltage applied to the inverter able to deal with the electric power required by the motor if a voltage across the electric energy storage device is equal to or higher than a predetermined voltage, and controls the first DC/DC converter to make the voltage applied to the inverter able to deal with the electric power required by the motor and controls the second DC/DC converter to be in a directly connected state if the voltage across the electric energy storage device is smaller than the predetermined voltage.

According to the present invention, since the second DC/DC converter is connected between the power line contact terminals and the terminals of the inverter, even when a high voltage is applied from the power lines to the electric automobile, the second DC/DC converter functions as an electric damping device to prevent the high voltage from being applied to the inverter. As a result, the inverter is prevented from being unduly heated, and an appropriate voltage lower than the high voltage is applied to the inverter and the motor through the second DC/DC converter.

When the power line contact terminals axe moved from a separation state into a contact state with respect to the power lines, the control device controls the first DC/DC converter to step up a voltage between the power line contact terminals into a level corresponding to a power line feeding voltage, and controls the second DC/DC converter to make the voltage applied to the inverter able to deal with the electric power required by the motor. While the electric automobile is traveling while dealing with the electric power required by the motor, a large inrush current is prevented from flowing from the power lines into the electric automobile when the power line contact terminals contact the power lines. In other words, when the power line contact terminals of the electric automobile contact the power lines, there is no need to limit the electric power required by the motor, and a large inrush current is prevented from being generated.

When the power line contact terminals are moved from the separation state into the contact state with respect to the power lines, the control device controls the first DC/DC converter to gradually increase a charging current that is supplied from the power lines to the electric energy storage device through the first DC/DC converter, and thereafter, if a potential difference between input and output terminals of the first DC/DC converter becomes equal to or smaller than a predetermined value, the control device controls the first DC/DC converter to be in the directly connected state. In this manner, any switching loss of the first DC/DC converter is reduced, and the efficiency with which the electric energy storage apparatus is charged is increased.

The control device controls the first DC/DC converter and the second DC/DC converter to be in the directly connected state if the motor is in a regenerative mode. Accordingly, if the motor is in the regenerative mode, any power loss of the first DC/DC converter and the second DC/DC converter is reduced, and regenerated electric power can be retrieved efficiently.

According to the present embodiment, since the second DC/DC converter is connected between the power line contact terminals and the terminals of the inverter, even when a high voltage used in the field of electric railways is applied from the power lines, the electric automobile makes it possible to apply an appropriate voltage lower than ouch a high voltage to the motor and the inverter that supplies the motor with electric power, so that the inverter is prevented from being unduly heated and the inverter and the rector can be relatively small in size.

The above objects, features, and advantages will become more apparent from the following description when taken in conjunction with the accompanying drawings in which an embodiment of the present invention is shown.

BRIEF DESCRIPTION OF THE DRAWINGS

FIG. 4 is a flowchart ox a power feeding control process which is carried out by the vehicle power feeding transportation system including the electric automobile according to the embodiment;

FIG. 5 is a table showing travel lag modes of the electric automobile; and

DESCRIPTION OF THE PREFERRED EMBODIMENTS

An embodiment of the present invention will be described below with reference to the drawings.

Figure 1:
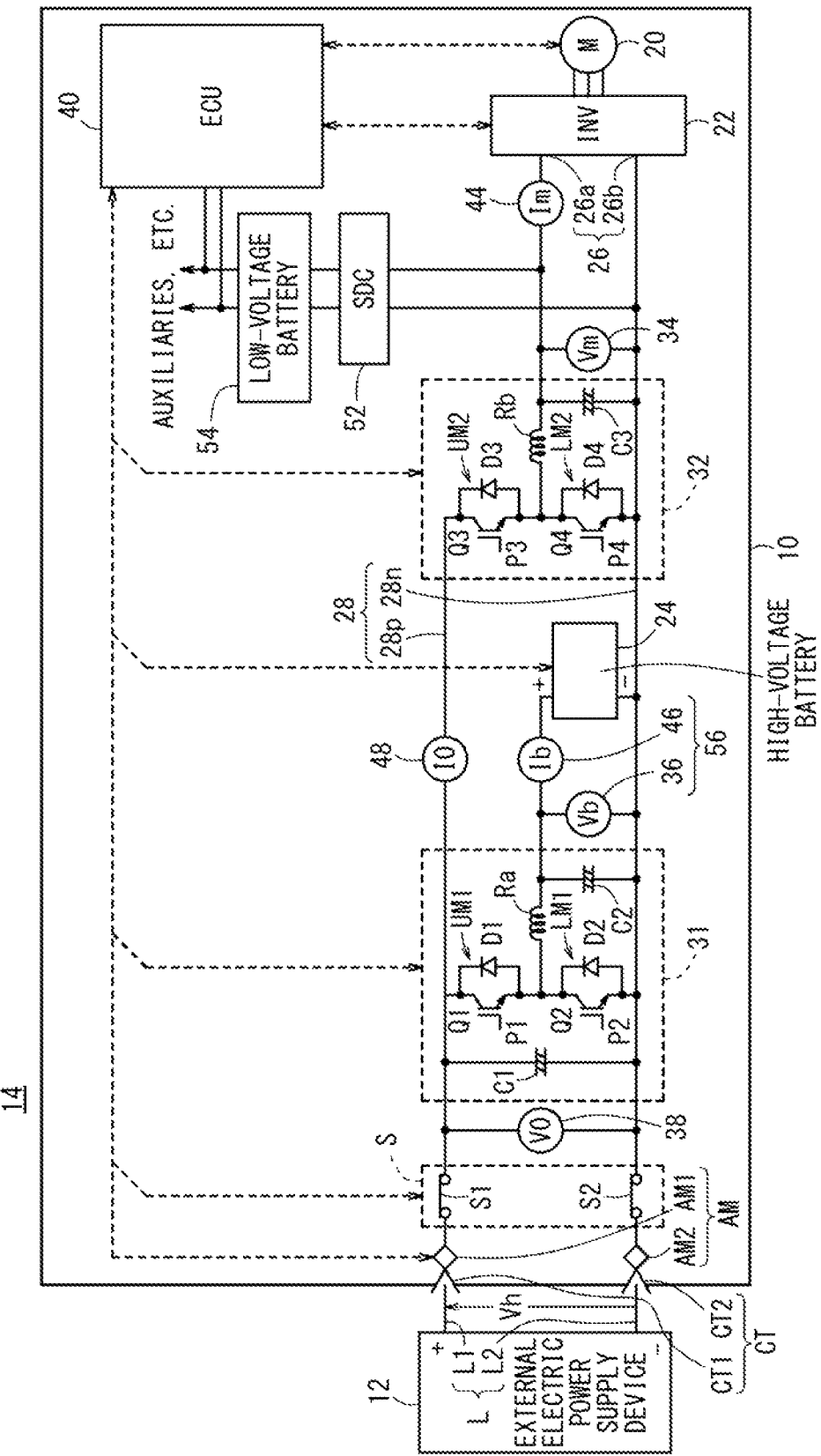
FIG. 1 is a circuit block diagram showing a configuration of a vehicle power feeding transportation system including an electric automobile according to an embodiment.

FIG. 1 shows a configuration of a vehicle power feeding transportation system 14 comprising an electric automobile 10 according to the embodiment and an external electric power supply device 12 for supplying electric power at an power line feeding voltage (hereinafter referred to as "feeding voltage") Vh, which is a high DC voltage, to the electric automobile 10 through power lines L that include a positive power line L1 and a negative power line L2.

The external electric power supply device 12 may be an electric power supply device that only sends electric power or a chargeable and dischargeable electric power supply device including an electric energy storage device. In the present embodiment, the external electric power supply device 12 comprises a chargeable and dischargeable electric power supply device.

The electric automobile 10 has power receiving arms AM, which include a positive power receiving arm AM1 and a negative power receiving arm AM2, having respective distal ends (ends closer to the power lines L) connected to power line contact terminals CT, which include a positive power line contact terminal CT1 and a negative power line contact terminal CT2, for feeding or charging electric power in contact with the power lines L.

The power receiving arms AM may be expandable/contractible arms, or tiltable arms which have other ends pivotally mounted on the vehicle body of the electric automobile 10 and the distal ends connected to the power line contact terminals CT and separated from the vehicle body or the electric automobile 10, or combination of expandable/contractible arms and tiltable arms.

The other ends of the power receiving arms AM, which are mounted on the vehicle body of the electric automobile 10, are electrically connected to respective terminals of a contactor S including a positive contactor S1 and a negative contactor S2.

The other terminals of the contactor S are electrically connected to wires 28 including a positive wire 28$p$ and a negative wire 28$n$.

The electric automobile 10 also includes, in addition to the power receiving arms AM with the ends engaging the power line contact terminals CT and the contactor S, a motor 20 for propelling the electric automobile 10, an inverter 22 serving as an electric power converting device for supplying three-phase AC electric power to the motor 20, a high-voltage battery 24 as an electric energy storage device, a first DC/DC converter (hereinafter also referred to as "first converter") 31 for supplying electric power whose voltage has been stepped up from the voltage of the high-voltage battery 24 to the inverter 22 through DC terminals 26, which include a positive DC terminal 26a and a negative DC terminal 26b, on the DC input aide of the inverter 22, the first converter 31 having a low-voltage side connected to the high-voltage battery 24 and a high-voltage side connected to the wires 28 from the other terminals of the contactor S, a second DC/DC converter (hereinafter also referred to as "second converter") 32 having a low-voltage side connected to the DC terminals 26 of the inverter 22 and a high-voltage side connected to the wires 28 from the other terminals of the contactor S, and an ECU (Electronic Control Unit) 40 as a control device. The ECU 40 controls the inverter 22, the first and second converters 31, 32, the power-feeding contactor assembly S, the power receiving arms AM, and the motor 20.

Although not shown, the motor 20 has its rotational shaft operatively connected to drive wheels through a transmission or connected as in-wheel motors to the drive wheels.

The high-voltage battery 24 may comprise secondary cells such as lithium ion secondary ceils, or a capacitor, or the like. In the present embodiment, the high-voltage battery 24 comprises secondary cells.

Figure 2:
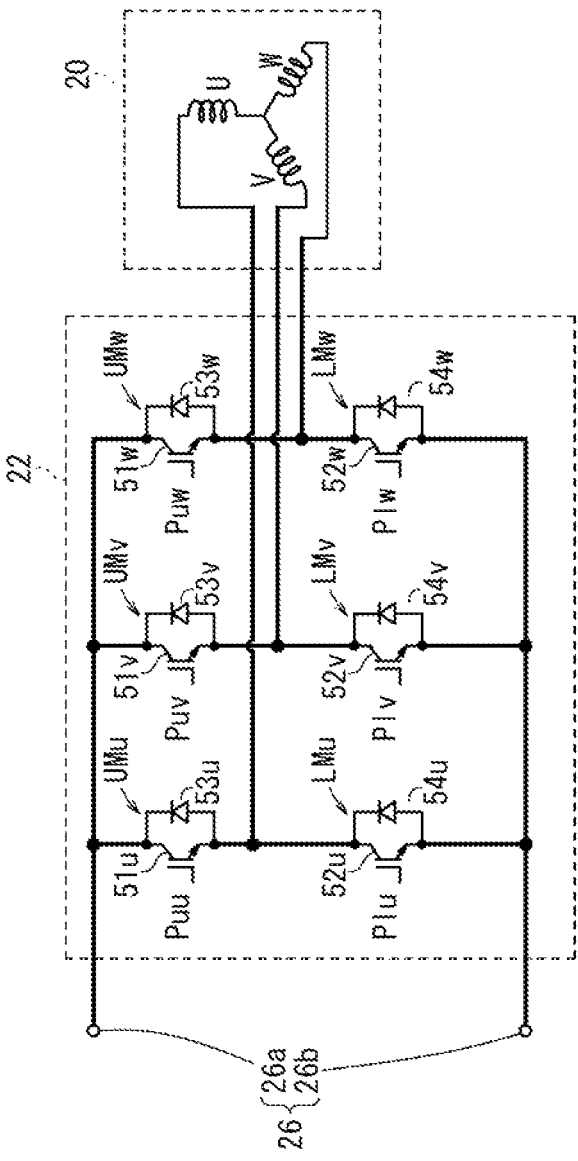
FIG. 2 is a circuit diagram of an inverter of the electric automobile.

FIG. 2 is a circuit diagram of the inverter 22, which is of known nature. The inverter 22 is of a three-phase full-bridge configuration. When the motor 20 operates in a power mode for propelling the electric automobile 10, the inverter 22 operates in a DC-to-AC conversion process to convert DC electric power into three-phase AC electric power and supply the three-phase AC electric power to the U-, V-, and W-phase coils of the motor 20. When the motor 20 operates in a regenerative mode for generating electric power, the inverter 22 operates in an AC-to-DC conversion process to supply the converted DC electric power from the DC terminals 26 through the second converter 32 to the positive wire 28p and the negative wire 28n, thereby charging the high-voltage battery 24 through the first converter 31, for example.

The inverter 22 comprises transistors $52u$, $52v$, $51w$, $52u$, $52v$, $52w$ as switching elements such as MOSFETs, IGBTs, or the like energized by the ECU 40 and diodes $53a$, $53v$, $53w$, $54u$, $54v$, $54w$ reverse-connected across the transistors $51u$, $51v$, $51w$, $12u$, $52v$, $52w$, respectively.

The transistor $51u$ and the diode $53u$ jointly make up a U-phase upper arm element UMu, and the transistor $52u$ and the diode $54u$ jointly make up a U-phase lower arm element LMu. The transistor $51v$ and the diode $53v$ jointly make up a W-phase upper arm element UMv, and the transistor $52v$ and the diode $54v$ jointly make up a V-phase lower arm element LMv. The transistor $51w$ and the diode $53w$ jointly make up a W-phase upper arm element UMw, and the transistor $52w$ and the diode $54w$ jointly make up a W-phase lower arm element LMw.

The transistors $51u$, $51v$, $51w$ of the upper arm elements are switched by PWM (Pulse Width Modulation) signals Puu, Puv, Puw supplied from the ECU 40, and the transistors $52u$, $52v$, $52w$ of the lower arm elements are switched by PWM signals Plu, Plv, Plw supplied from the ECU 40.

As shown in FIG. 1, the electric automobile 10 has various voltage sensors including a voltage sensor 54 for detecting a voltage thereinafter referred to as "motor voltage") Vm between the DC terminals 26 of the inverter 22, a voltage sensor 36 for detecting a voltage (hereinafter referred to as "battery voltage) Vb across the high-voltage battery 24, and a voltage sensor 38 for detecting a DC voltage (hereinafter referred to as "line voltage") V0 across the switch S. The detected voltages from these voltage sensors 34, 36, 38 are read by the ECU 40.

The electric automobile 10 has various current sensors including a current sensor 44 for detecting a current (hereinafter referred to as "motor current") Im flowing through the DC terminal 26a of the inverter 22, a current sensor 46 for detecting a current (hereinafter referred to as "battery current") Ib flowing through the high-voltage battery 24, and a current sensor 48 for detecting a current (hereinafter referred to as "input current") I0 flowing into the second converter 32. The detected currents from these current sensors 44, 46, 48 are read by the ECU 40.

The voltage sensor 36, the current sensor 46, and a temperature sensor, not shown, jointly make up an SOC sensor 56 for detecting an SOC (State Of Charge, a charged state or a charged level in the range from 0% to 100%) of the high-voltage battery 24. Based on an output signal from the SOC sensor 56, the ECU 40 calculates a charged level SOC.

The motor voltage Vm is stepped down by a step-down converter (SDC) 52, which applies the stepped-down motor voltage to charge a low-voltage battery 54 having a nominal voltage value of +12 [V].

The low-voltage battery 54 supplies electric power to auxiliaries such as lights, etc., not shown, and also supplies electric power to the ECU 40.

The first converter 31, which is of known nature, comprises transistors Q1, Q2 as switching elements across which respective diodes D1, D2 are reverse-connected, a reactor Ra, and capacitors C1, C2. The transistors Q1, Q2 may be power switching elements such as MOSFETs, IGBTs, or the like.

The transistor Q1 is switched by a PWM (Pulse Width Modulation) signal P1 supplied from the ECU 40, and the transistor Q2 is switched by a PWM signal P2 supplied from the ECU 40.

The transistor Q1 and the diode D1 jointly make up an upper arm element UM1, whereas the transistor Q2 and the diode D2 jointly make up a lower arm element LM1.

The second converter 32, which is also of known nature, comprises transistors Q3/Q4 as switching elements across which respective diodes D3, D4 are reverse-connected, a reactor Rb, and a capacitor C3. The transistors Q3, Q4 may be power switching elements such as MOSFETs, IGBTs, or the like.

The transistor Q3 is switched by a PWM signal P3 supplied from the ECO 40, and the transistor Q4 is switched by a PWM signal P4 supplied from the ECU 40.

The transistor Q3 and the diode D3 jointly make up an upper arm element UM2, whereas the translator Q4 and the diode D4 jointly make up a lower am element LM2.

Figure 3:
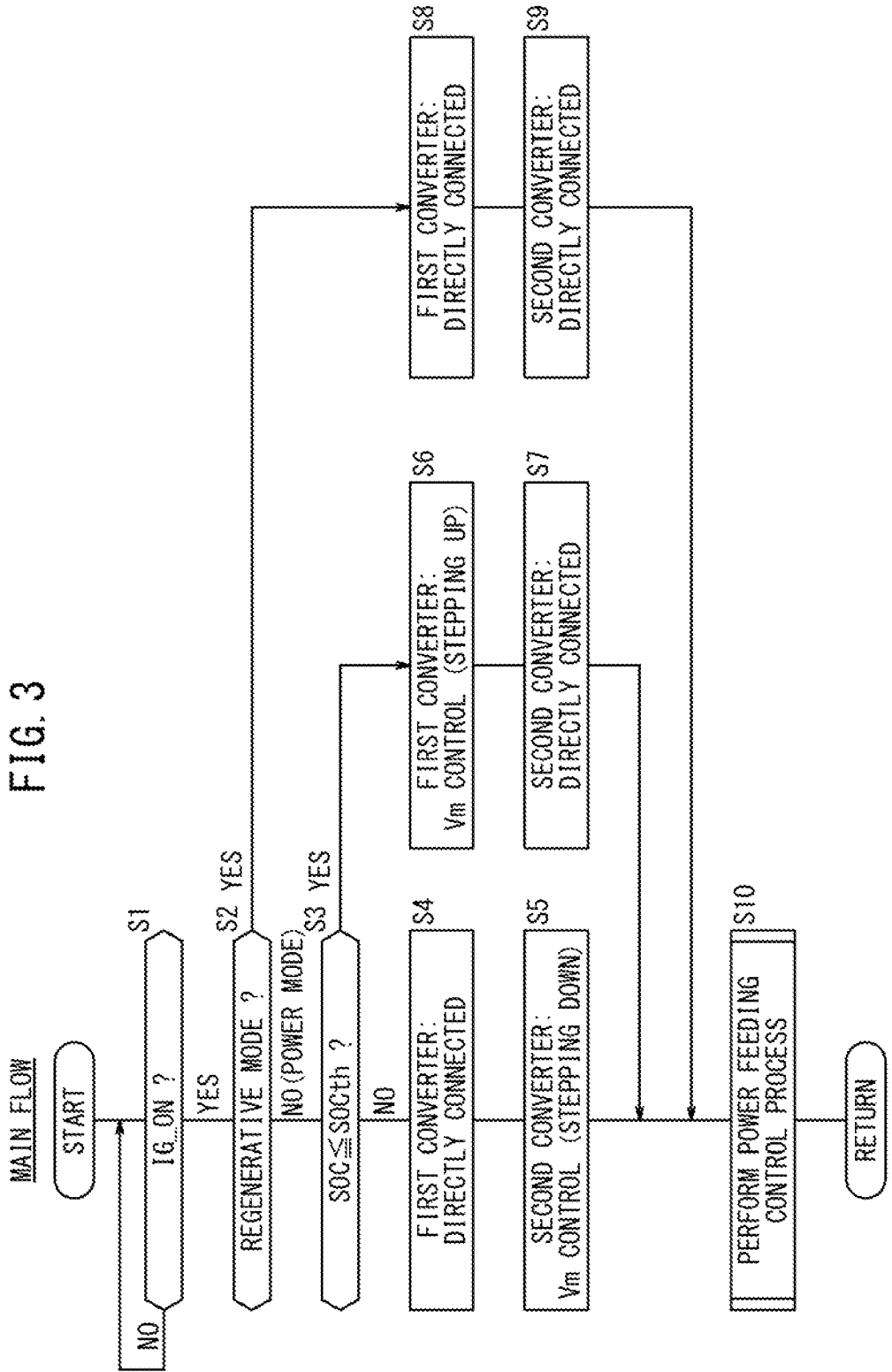
FIG. 3 is a main flowchart of an operation sequence of the vehicle power feeding transportation system including the electric automobile according to the embodiment.

The vehicle power feeding transportation system 14 is basically constructed as described above, including the electric automobile 10 according to the present embodiment and the external electric power supply device 12 that supplies electric power under the power line feeding voltage, i.e., the feeding voltage Vh, which is a high DC voltage, to the electric automobile 10 through the power lines L including the positive power line L1 and the negative power line L2. Operation of the vehicle power feeding transportation system 14 will he described below with reference to a main flowchart shown in FIG. 3, a flowchart of a power feeding control process shown in FIG. 4, and a table 60 showing traveling modes of the electric automobile 10 as shown in FIG. 5. A program represented toy the flowcharts is executed by the ECU 40 of the electric automobile 10.

In step S1, the ECU 40 judges whether an unillustrated ignition switch (power supply switch) of the electric automobile 10 is ON or not. If the ECU 40 judges that the ignition switch is ON (step S1: YES), then the ECU 40 judges whether the electric automobile 10 is in the regenerative mode or not based on the direction of the motor current Im, etc. in step S2.

If the ECU 40 judges that the electric automobile 10 is not in the regenerative mode (step S1: NO), then the ECU 40 judges that the electric automobile 10 is in the power mode, in step S3, the ECU 40 judges whether or not the charged level SOC is lowered to a level equal to or lower than a charged level threshold value SOCth. If the ECU 40 judges that the charged level ECU is higher than the charged level threshold value SOCth (step S3: NO), then the ECU 40 performs a power mode control process in a traveling mode I (see FIG. 5) wherein the battery voltage Vb across the high-voltage battery 24 is high, in steps S4, S5.

Specifically, in step S4, the ECU 40 places the first converter 31 into a first directly connected state by setting both the PWM signals P1, P2 to a duty ratio of 0[%], thereby directly and continuously supplying electric power under the battery voltage Vb of the high-voltage battery 24 through the diode D1 to the wires 28 connected to the input terminals of the second converter 32. In step S5, the ECU 40 calculates a drive torque to be generated by the motor 20 based on the operation movement of an accelerator pedal, or the like, not shown, determines a target electric power (the motor current Im and the motor voltage Vm) to provide an regained motor electric power for generating the drive torque, and determines a duty ratio for the PWM signals P3, P4 of the second converter 32 by referring to the battery voltage Vb.

During the power mode control process in the traveling mode I, as described above, the electric power from the high-voltage battery 24 is supplied through the first converter 31 (the diode D1) placed in the directly connected state to the input terminals of the second converter 32, which controls the motor voltage Vm depending on the torque required by the motor 20. During the power mode control process in the traveling mode I, any power loss is reduced because the first converter 31 is not switched.

If an affirmative judgment is made in step S3 (step S3: YES), then the ECu 40 performs a reduced-SOC control process in a traveling mode V wherein the battery voltage Vb across the high-voltage battery 24 is low, in steps S6, S7.

In the reduced-SOC control process, the processing of step S7 will first be described for a better understanding of the present invention. In step S7, in order to eliminate any switching loss of the second converter 32, the ECU 40 sets the PWM signal P3 of the upper arm element UM2 of the second converter 32 to a duty ratio of 100 [%] and sets the PWM signal P4 of the lower arm element LM2 of the second converter 32 to a duty ratio of 0 [%]. The second converter 32 is now placed into a directly connected state, thereby applying the line voltage V0 as an input voltage of the inverter 22 through the transistor Q3 that is ON between the DC terminals 26a, 26b of the inverter 22. In step S6, the first converter 31 steps up the battery voltage Vb across the high-voltage battery 24 depending on the torque required by the motor 20, thus controlling the motor voltage Vm. During the reduced-SOC control process in the traveling mode V, therefore, a voltage drop of the high-voltage battery 24 is compensated for according to the stepping-up operation of the first converter 31.

If the ECU 40 judges that the electric automobile 10 is in the regenerative mode in step S3 (step 32: YES), then the ECU 40 performs a regenerative control process in a traveling mode VI in steps S8, S9, in the regenerative control process, the ECU 40 sets all the PWM signals Puu, Puv, Puw, Plu, Plv, Plw of the inverter 22 to a duty ratio of 0 [5]. The processing of step S9 will first be described for a better understanding of the present invention. In step S9, in order to maximally charge, i.e., fully store, regenerated electric power into the high-voltage battery 24, the ECU 40 places the second converter 32 into a directly connected state by setting both the PWM signals P3, P4 to a duty ratio of 0 [%]. In step S8, the ECU 40 places the first converter 31 into a directly connected state by setting the PWM signal P1 to a duty ratio of 100 [%] and the PWM signal P2 to a duty ratio of 0 [%], thereby supplying the sector current Im, which is a regenerated current flowing from the motor 20, through the reactor Rb, the diode D3, the transistor Q1, and the reactor Ra to the high-voltage battery 24, thereby charging the high-voltage battery 24. During the regenerative control process in the traveling mode VI, any power loss is minimized because both the first and second converters 31, 32 are not switched.

While steps S1 through S9 are being carried out, the contactors S1, S2 are OFF, i.e., are opened.

In step S10, the ECU 40 performs a power feeding control process in traveling modes II, III, IV.

In step S10a shown in FIG. 4, the ECU 40 judges whether a power feeding mode for feeding electric power to the electric automobile 10 from the power lines L can be turned on or not. The ECU 40 makes a judgment based on whether the read that the electric automobile 10 is traveling along is equipped with the power lines L or not, or whether the zone in which the electric automobile 10 is traveling is equipped with the power lines L or not.

If an affirmative judgment is made in step S10a (step S10a: YES), then since it is presumed that the high-voltage battery 24 can start being charged without delay, the second converter 32 controls the sector voltage Vm depending on the torque required by the motor 20 based on the electric power from the high-voltage battery 24 in step S10b.

In step S10c, the ECU 40 precharges the capacitor C1 during a pre-feeding control process in the traveling mode II.

Specifically, when the power line contact terminals CT of the electric automobile 10 move from a separation state into a contact state with respect to the power lines L, an excessive inrush cement tends to flow power line info the capacitor C1, which is a smoothing capacitor having a large electrostatic capacitance, and the high-voltage battery 24. In order to prevent the capacitor C1 and the high-voltage battery 24 from being deteriorated by the inrush current, the ECU 40 controls the first converter 31 to step up the line voltage V0 between the wires 28 to bring the potential difference between the line voltage V0 and the power line feeding voltage Vh within a predetermined potential difference, i.e., the ECU 40 actually controls the first converter 31 to step up the line voltage V0 up to a voltage corresponding to the power line feeding voltage Vh, for the purpose of limiting the inrush current.

Then, in step S10d, the power receiving arms Ad are extended, i.e., start to be expanded or tilted.

In step S10e, the ECU 40 judges whether the power line contact terminals CT connected to the distal ends of the power receiving arms AM have contacted the power lines L or not, using a proximity sensor or the like, not shown.

If an affirmative judgment is made in step S10e (step S10e: YES), then the ECU 40 turns on the contactor S, thereby equalizing the line voltage V0 to the power line feeding voltage Vh, i.e., the voltage between the power lines L (V0=Vh), in step S10f.

In step S10g, the ECU 40 performs an initial feeding control process in the traveling mode III.

In the initial feeding control process, in order to prevent the capacitor C1 and the high-voltage battery 24 from being deteriorated when the power line contact terminals CT of the electric automobile 10 move from the separation state into the contact state with respect to the power lines L, the ECU 40 specifically limits an excessive inrush current against flowing into the capacitor C1 and the high-voltage battery 24. Specifically, the ECU 40 limits an increase in the battery current Ib (time-depending change $\Delta Ib/\Delta t$) as a charging current so as not to be equal to or larger than a predetermined increase (increase threshold value). Stated otherwise, the ECU 40 increases the charged level SOC of the high-voltage battery 24 until the judgment in step S10h becomes affirmative, i.e., until the difference between the line voltage V0 and the battery voltage Vb becomes equal to or smaller than a predetermined value, while imposing a rate limit to gradually increase the battery current Ib that flows as a charging current from the power lines L through the power line contact terminals CT into the high-voltage battery 24.

If the ECU 40 judges that the difference between the line voltage V0 and the battery voltage Vb becomes equal to or smaller than the predetermined value (step S10h: YES), then the ECU 40 judges that no excessive inrush current flows into the high-voltage battery 24 even when the first converter 31 is in the directly connected state by setting the PW signal P1 to a duty ratio of 100 [%] and the PWM signal P2 to a duty ratio of 0 [5]. In step S10i, the ECU 40 places the first converter 31 into the directly connected state, continuously charging the high-voltage battery 24 with an increased charging efficiency provided by no switching of the first converter 31 in the feeding control process.

In step S10j, the ECU 40 judges whether the high-voltage battery 24 is in a predetermined fully charged state or not based on the charged level SOC. If the ECU 40 judges that the high-voltage battery 24 is in the fully charged state (step S10j; YES), then the ECU 40 turns off, i.e., opens, the power feeding contactors S1, S2 in step S10k.

Then, in step S101, the power receiving arms Ad are contracted or tilted back into their predetermined position in the electric automobile 10.

The power feeding control process during travelling is now finished, and control goes back to step S1. If the ECU 40 judges that the power feeding mode cannot be turned on (step S10a: NO), then control skips the processing from step S10a through step S101, and returns to step S1.

Figure 6:
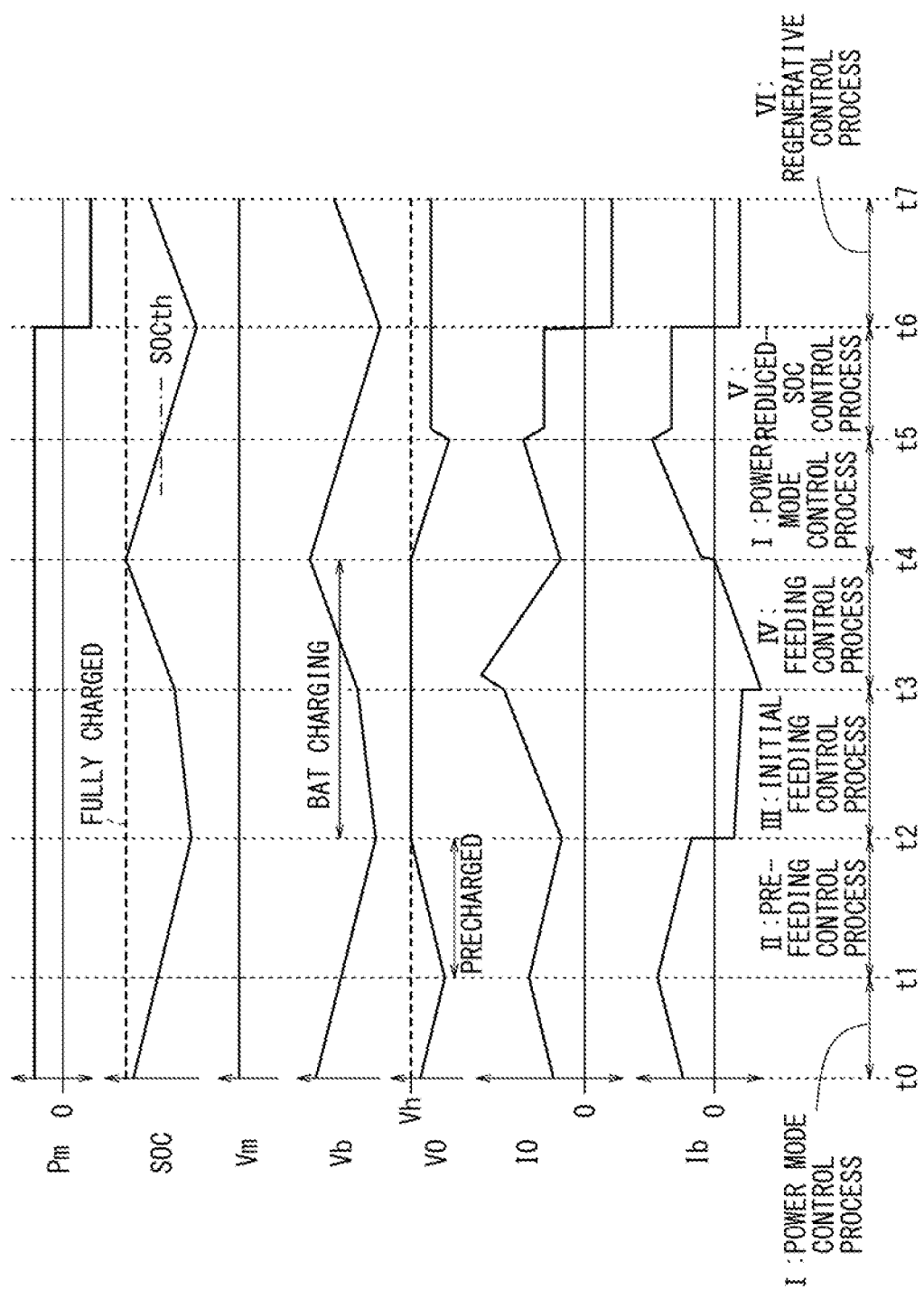
FIG. 6 is a timing chart showing by way of example the relationship between the traveling modes through which the electric automobile goes and physical quantities.

An example of the relationship between the traveling modes I through VI through which the electric automobile 10 goes and physical quantities will be described below with reference to a timing chart shown in FIG. 6.

For a better understanding of the present invention, it is assumed that motor electric power Pm controlled to have a positive constant valve when in the power mode and controlled to have a negative constant value when in the regenerative mode, and the motor voltage Vm detected by the voltage sensor 34 is controlled to have a constant value in both the power mode and the regenerative mode.

During the power mode control process in the traveling mode I between time t0 and time t1 (the contactors S1, S2 are OFF), since the first converter 31 is placed in the directly connected state, the battery voltage Vb and the line voltage V0 decrease as the charged level SOC decreases. Since the motor electric power to is kept at a constant level by the inverter 22, the battery current Ib as a discharging current and the input current I0 flowing Into the second converter 32 increase as the charged level SOC decreases.

During the pre-feeding control process in the traveling mode II between time t1 and time t2, i.e., immediately before the power line contact terminals CT of the electric automobile 10 contact the power lines L, the voltage across the capacitor C1, i.e., the line voltage V0, is gradually increased up to the approximate power line feeding voltage Vh to precharge the capacitor C1 in order to prevent an excessive inrush current from flowing into the capacitor C1. As the electric automobile 10 is in the power mode with the motor electric power Pm being constant between, time t1 and time t2, the input current I0, the charged level SOC, the battery voltage Vb, and the battery current Ib are gradually reduced, At time t2, the power receiving arms AM start to be expanded to bring the power line contact terminals CT into contact with the power lines L. During the initial feeding control process in the traveling move III between time t2 and time t3, the first converter 31 controls the battery current Ibat as the charging current to increase gradually. When the battery voltage Vb increases until the difference between the battery voltage Vb and the power line feeding voltage Vh falls within a predetermined value, the first converter 31 is brought into the directly connected state by setting the PWM signal P1 to a duty ratio of 100 [%] and the PWM signal P2 to a duty ratio of 0 [%] (time t3).

During the feeding control process in the traveling mode IV between time t3 and time t4, the high-voltage battery 24 is quickly charged. When the charged level SOC of the high-voltage battery 24 indicates that the high-voltage battery 24 is fully charged (time t4), the ECU 40 turns off the ON-state contactors S1, S2, and retracts the power receiving arms AM away from the power lines L.

While the high-voltage battery 24 is being charged from the external electric power supply between time t2 and time t4 (BAT CHARGING), the external electric power supply device 12 is of a constant voltage. During this time, the power line feeding voltage Vh may be varied in order to control the external electric power supply device 12 to supply constant electric power.

During the power mode control process in the traveling mode I between time t4 and time t5 with the first converter 31 in the directly connected state and the second converter 32 controlling the motor voltage Vm, when the charged level SOC becomes equal to or lower than the charged level threshold value SOCth at time t5, the reduced-SOC control process in the traveling mode V is initiated and continued between time t5 and time t6 with the first converter 31 controlling the motor voltage Vm and the second converter 32 in the directly connected state. During the reduced-SOC control process, in order to maintain the motor electric power Pm to keep the torque, the line voltage V0 is increased and kept by the first converter 31.

During the regenerative control process in the traveling mode VI between time t6 and t7, both the first converter 31 and the second converter 32 are placed In the directly connected state, increasing the battery voltage Vb and the charged level SOC.

[Overview of the Embodiment]

As described above, with the electric automobile 10 according to the present embodiment, the electric power supplied from the high-voltage battery 24 as the electric energy storage device mounted on the electric automobile 10 and/or the electric power supplied from the power lines L through the power line contact terminals CT on the electric automobile 10 is converted by the inverter 22 and supplied to the motor 20 for propelling the electric automobile 10.

The electric automobile 10 has the first converter 31 connected between the positive and negative terminals of the high-voltage battery 24 and the power line contact terminals CT, the second converter 32 connected between the power line contact terminals CT and the DC terminals 26a, 26b of the inverter 22, and the ECU 40 for controlling the first and second converters 31, 32. When the electric power is supplied from the power lines L through the power line contact terminals CT, the ECU 40 controls the second converter 32 to make the voltage (DC voltage V0) applied to the inverter 22 able to deal with the electric power required by the motor 20. When no electric power is supplied from the power lines L with the power line contact terminals CT being spaced from the power lines L, the ECU 40 controls the first converter 31 to be in the directly connected state (step S4) end controls the second converter 32 to make the motor voltage Vm, which is the voltage applied to the inverter 22, able to deal with the electric power required by the motor 20 (step S5) if the charged level SOC is equal to or higher than the charged level threshold value SOCth, i.e., if the voltage across the high-voltage battery 24 is equal to or higher than a predetermined voltage (step S3: NO), and the ECU 40 controls the first converter 31 to make the motor voltage Vm, which is the voltage applied to the inverter 22, able to deal with the electric power required by the motor 20 (step S6) and controls the second converter 32 to be in the directly connected state (step S7) if the charged level COO is lower than the charged level threshold value SOCth, i.e., if the voltage across the high-voltage battery 24 is lower than the predetermined voltage (step S3: YES).

According to the present embodiment, the electric automobile 10 includes, in addition to the first converter 31 that steps op the battery voltage Vb of the high-voltage battery 24 to a level corresponding to the power line feeding voltage Vh, the second converter 32 connected between the power line contact terminals CT, which are brought into contact with the power lines L to receive electric power under the power line feeding voltage Vh which is high, and the DC terminals 26 of the inverter 22 for energizing the motor 20. Therefore, even if the high power line feed log voltage Vh is applied from the power lines L to the electric automobile 10, the second converter 32 functions as an electric damping device to prevent the high voltage from being applied to the inverter 22.

As a result, the inverter 22 is prevented from being unduly heated, and an appropriate voltage lower than the high voltage is applied to the inverter 22 and the motor 20 through the second converter 32.

When the power line contact terminals CT are moved from the separation state into the contact state with respect to the power lines L, the ECU 40 controls the first converter 31 to step up the battery voltage Vb to bring the voltage between the power line contact terminals CT into a level corresponding to the power line feeding voltage Vh (step S10c), and controls the second converter 32 to make the voltage applied to the inverter 22 able to deal with the electric power required by the motor 20 (step S10b). In this manner, a large inrush current is prevented from being generated when the power line contact terminals CT contact the power lines L. Furthermore, there is no need to limit the electric power required by the motor 20 when the power line contact terminals CT contact the power lines L.

When the power line contact terminals CT are moved from the separation state into the contact state with respect to the power lines L, the ECU 40 controls the first converter 31 to gradually increase the charging current that is supplied from the power lines L to the high-voltage battery 24 through the first converter 31 (step S10g), and thereafter, if the potential difference between the input and output terminals of the first converter 31 becomes equal to or smaller than a predetermined value (step S10h: YES), the ECU 40 controls the first converter 31 to be in the directly connected state (step S10i), thereby reducing any switching loss of the first converter 31. It is thus possible to increase the efficiency with which the high-voltage battery 24 is charged from the external electric power supply device 12 through the power lines L, the power receiving arms AM, the contactor S, and the first converter 31.

If the motor 20 is in the regenerative mode (step S2: YES), then the ECU 40 controls the first and second converters 31, 32 to be in the directly connected state (steps S8, S9). Therefore, arty power loss of the first and second converters 31, 32 in the regenerative mode is reduced, and electric power regenerated by the motor can be retrieved efficiently.

According to the present embodiment, as described above, since the second converter 32 is connected between the power line contact terminals CT and the DC terminals 26 of the inverter 22, even when a high voltage used in the field of electric railways is applied from power lines L, the electric automobile 10 makes it possible to apply an appropriate voltage lower than such a high voltage to the motor 20 and the inverter 22 that supplies the motor 20 with electric power, so that the inverter 22 is prevented from being unduly heated and the inverter 22 and the motor 20 can be relatively small in size.

Although the preferred embodiment of the present in vent ion has been described above, it should be under stood that various changes and modifications may be made to the embodiment based on the descriptions in this specification.

What is claimed is:

1. An electric automobile for converting electric power supplied from an electric energy storage device mounted or the electric automobile and/or power lines through power line contact terminals on the electric automobile, by an inverter mounted on the electric automobile, and supplying the converted electric power to a motor for propelling the electric automobile, comprising:
  a first DC/DC converter connected between terminals of the electric energy storage device and the power line contact terminals;
  a second DC/DC converter connected between the power line contact terminals and terminals of the inverter; and
  a control device for controlling the first DC/DC converter and the second DC/DC converter;
  wherein when the electric power is supplied from the power lines through the power line contact terminals, the control device controls the second DC/DC converter to make a voltage applied to the inverter able to deal with electric power required by the motor; and
  when no electric power is supplied from the power lines with the power line contact terminals being spaced from the power lines, the control device controls the first DC/DC converter to be in a directly connected state and controls the second DC/DC converter to make the voltage applied to the inverter able to deal with the electric power required by the motor if a voltage across the electric energy storage device is equal to or higher than a predetermined voltage, and controls the first DC/DC converter to make the voltage applied to the inverter able to deal with the electric power required by the motor and controls the second DC/DC converter no be in a directly connected state if the voltage across the electric energy storage device is smaller than the predetermined voltage.

2. The electric automobile according to claim 1, wherein when the power line contact terminals are moved from a separation state into a contact state with respect to the power lines, the control device controls the first DC/DC converter to step up a voltage between the power line contact terminals into a level corresponding to a power line feeding voltage, and controls the second DC/DC converter to make the voltage applied to the inverter able to deal with the electric power required by the motor.

3. The electric automobile according to claim 2, wherein, when the power line contact terminals are moved from the separation state into the contact state with respect to the power lines, the control device controls the first DC/DC converter to gradually increase a charging current that is supplied from the power lines to the electric energy storage device through the first DC/DC converter, and thereafter, if a potential difference between input and output terminals of the first DC/DC converter becomes equal to or smaller than a predetermined value, the control device controls the first DC/DC converter to be in the directly connected state.

4. The electric automobile according to claim 1, wherein the control device controls the first DC/DC converter end the second DC/DC converter to be in the directly connected state if the motor is in a regenerative mode.

\* \* \* \* \*